US009448695B2

(12) United States Patent
O'Brien-Strain et al.

(10) Patent No.: US 9,448,695 B2
(45) Date of Patent: Sep. 20, 2016

(54) SELECTING WEB PAGE CONTENT BASED ON USER PERMISSION FOR COLLECTING USER-SELECTED CONTENT

(75) Inventors: Eamonn O'Brien-Strain, San Francisco, CA (US); Suk Hwan Lim, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 357 days.

(21) Appl. No.: 13/817,725

(22) PCT Filed: Dec. 14, 2010

(86) PCT No.: PCT/US2010/060285
§ 371 (c)(1),
(2), (4) Date: Feb. 19, 2013

(87) PCT Pub. No.: WO2012/082111
PCT Pub. Date: Jun. 21, 2012

(65) Prior Publication Data
US 2013/0275889 A1    Oct. 17, 2013

(51) Int. Cl.
*G06F 3/0484* (2013.01)
*G06Q 30/02* (2012.01)

(52) U.S. Cl.
CPC ......... *G06F 3/0484* (2013.01); *G06Q 30/0269* (2013.01)

(58) Field of Classification Search
CPC .................. G06F 3/048; G06F 3/1287; G06F 17/30699; G06F 17/30702; G06F 17/3089; G06F 21/31; G06F 2221/2119; G06F 3/0484; G06Q 30/0269
USPC ........................................ 715/745, 760, 789
See application file for complete search history.

(56) References Cited

U.S. PATENT DOCUMENTS 6,477,704 B1 * 11/2002 Cremia .............. H04N 7/17318
                                                              348/E7.071
6,938,021 B2 * 8/2005 Shear .................. G06Q 20/3674
                                                              705/67

(Continued)

FOREIGN PATENT DOCUMENTS

CN          1357846 A       7/2002
CN        101751444 A       6/2010

(Continued)

OTHER PUBLICATIONS

Popular definition. Merriam-Webster. retrieved from [http://www.merriam-webster.com/dictionary/popular] on [Mar. 6, 2016].*

(Continued)

*Primary Examiner* — Amy M Levy
(74) *Attorney, Agent, or Firm* — Fabian VanCott

(57) ABSTRACT

A method, system, and computer program product for selecting web page content based on user permission for collecting user-selected content within web pages (FIG. 4, 400) may comprise accessing web page data associated with a currently viewed web page (FIG. 4, 400), the web page data comprising a popular selection of content on the currently viewed web page (FIG. 4, 408) (505), with an electronic client device, presenting the popular selection of content of the currently viewed web page (FIG. 4, 400) to a user (535), and prompting the user to agree to the use of the user's selected content within a number of web pages in exchange for use of the popular selection of content on the web page (FIG. 4, 400). The web page content is selected, based on the user's response.

15 Claims, 10 Drawing Sheets

(56) References Cited

U.S. PATENT DOCUMENTS

| | | | |
|---|---|---|---|
| 6,963,850 B1 | 11/2005 | Bezos et al. | |
| 7,031,943 B1* | 4/2006 | James | G06Q 30/00 705/59 |
| 7,562,304 B2* | 7/2009 | Dixon et al. | 715/738 |
| 8,015,019 B1* | 9/2011 | Smith | G06F 17/3089 705/1.1 |
| 2002/0059574 A1 | 5/2002 | Tudor | H04N 7/17318 725/1 |
| 2003/0037144 A1 | 2/2003 | Pestoni | |
| 2003/0233278 A1* | 12/2003 | Marshall | G06Q 30/00 705/14.35 |
| 2005/0102515 A1* | 5/2005 | Jaworski | G06F 21/10 713/168 |
| 2005/0166138 A1* | 7/2005 | Kundu | 715/501.1 |
| 2006/0277460 A1* | 12/2006 | Forstall | G06F 17/30905 715/234 |
| 2007/0174888 A1* | 7/2007 | Rubinstein | H04N 7/17336 725/115 |
| 2008/0195664 A1* | 8/2008 | Maharajh | G06F 17/30035 |
| 2008/0209343 A1* | 8/2008 | Macadaan | G06F 3/0482 715/747 |
| 2009/0006311 A1 | 1/2009 | Ting et al. | |
| 2009/0024942 A1 | 1/2009 | Pendergast | |
| 2009/0282093 A1* | 11/2009 | Allard | G06Q 30/02 709/203 |
| 2009/0313224 A1* | 12/2009 | Fields | G06F 17/3089 |
| 2010/0004944 A1 | 1/2010 | Palaniappan | |
| 2010/0195131 A1 | 8/2010 | Nakata | |
| 2010/0202010 A1 | 8/2010 | Xiao | |
| 2010/0287028 A1* | 11/2010 | Hauser | G06Q 30/0201 705/7.29 |
| 2010/0293185 A1 | 11/2010 | Rosado et al. | |
| 2011/0197143 A1* | 8/2011 | Baszucki | 715/745 |
| 2011/0202881 A1* | 8/2011 | Singh | G06F 21/6245 715/833 |
| 2012/0124125 A1* | 5/2012 | Smith et al. | 709/203 |
| 2013/0254314 A1* | 9/2013 | Chow | H04L 67/06 709/206 |
| 2014/0129942 A1* | 5/2014 | Rathod | 715/720 |

FOREIGN PATENT DOCUMENTS

| | | |
|---|---|---|
| KR | 10-2003-0016037 | 2/2003 |
| WO | WO 2012150602 A1 * | 11/2012 |

OTHER PUBLICATIONS

Aaron L. Brenner, et al.; "Storytelling in an Automated Environment: Using Metadata Analysis to Develop Curated Guides to a Digital image Collection"; http://www.emeraldinsight.com/journals.htm?articleid=1558320&show=pdf.

* cited by examiner

SELECTING WEB PAGE CONTENT BASED ON USER PERMISSION FOR COLLECTING USER-SELECTED CONTENT

BACKGROUND

Web pages provide an inexpensive and convenient way to make information available to other individuals including, for example, consumers of products, students, and media enthusiasts. However, as the inclusion of multimedia content, embedded advertising, and online services becomes increasingly more prevalent in modern web pages, the web pages themselves have become substantially more complex. For example, in addition to their main content, many web pages display auxiliary content such as background imagery, advertisements, navigation menus, and links to additional content, among others.

It is often the case that web page owners, web page developers, or individuals that visit web pages wish to utilize only a portion of the information presented in a web page. Selection of desired content in web pages can eliminate extraneous or undesired content and significantly streamline a number of workflows. For instance, a user may desire to print a physical copy of an article located at an online news website without reproducing any of the other content on the web page containing the article, such as advertising, links to other content, etc. Similarly, an owner of a web page may wish to adapt a web page into another document, such as a marketing brochure, without including content from the web page that is superfluous to the new document. Additionally, a user may wish to display only the most relevant web content on a computing device that has a limited screen size such as a mobile smart phone. Other applications that may benefit from the selection of desired content in web pages include, for example, search, information retrieval, information management, archiving, and other applications.

BRIEF DESCRIPTION OF THE DRAWINGS

The accompanying drawings illustrate various examples of the principles described herein and are a part of the specification. The illustrated examples are given merely for illustration, and do not limit the scope of the claims.

FIG. 2 is a simplified partial representation of a Document Object Model (DOM) tree for an illustrative web page, according to one example of principles described herein.

DETAILED DESCRIPTION

Figure 1:
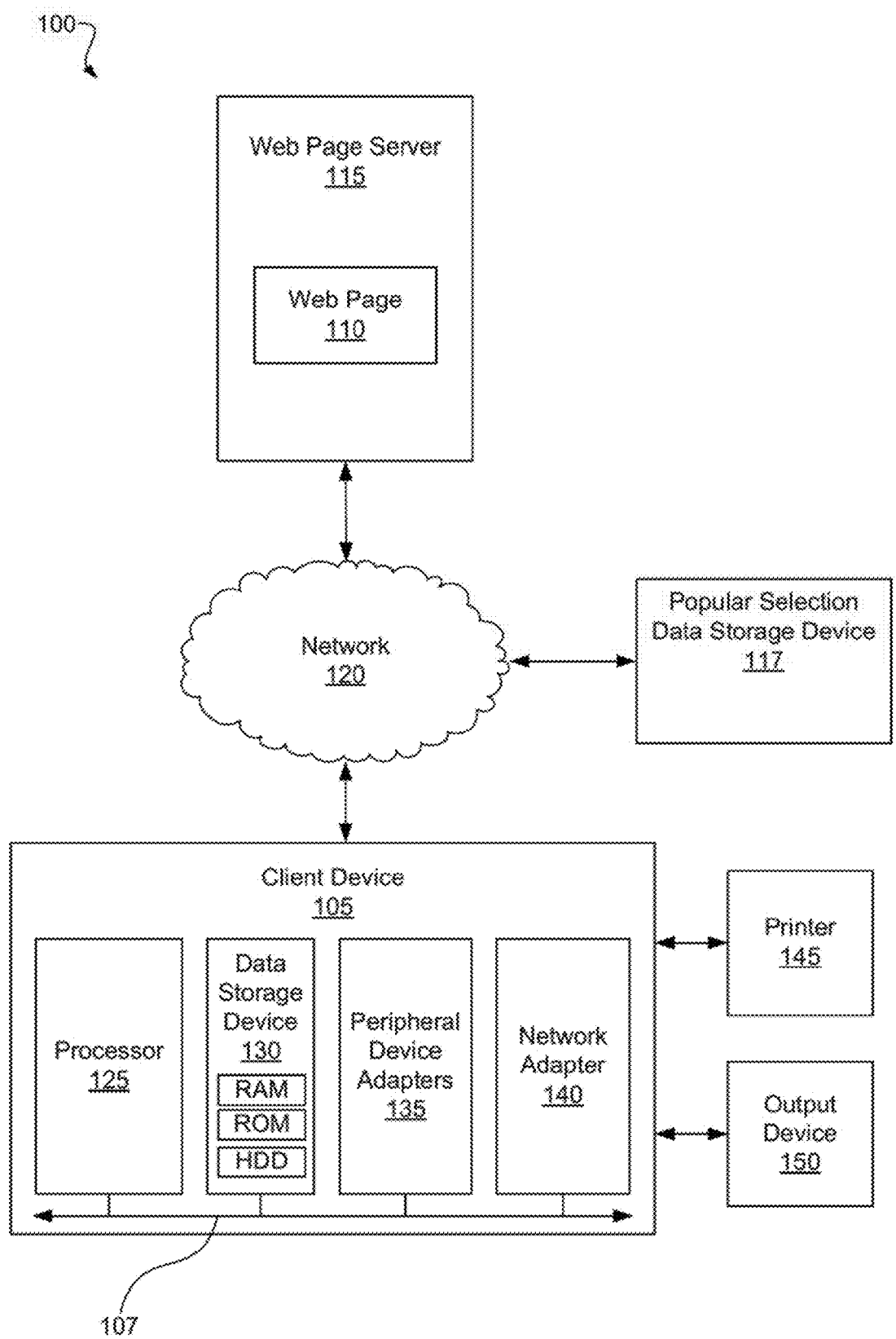

The present specification discloses systems and methods of selecting content within a web page using selections made previously by other users and encouraging a user to give permission to collect the user's-selected content within web pages. This allows a user to more rapidly pull only desired content from a web page.

As used herein, the term "includes" means includes but not limited to, the term "including" means including but not limited to. The term "based on" means based at least in part on.

As discussed above, there are many applications where selecting portions of a web page can be advantageous. For purposes of explanation, the specification uses the illustrative example of selecting portions of a web page for printing so that time and resources are not expended printing content from the web page that the user does not care to reproduce.

Currently, when a web page is printed, it includes a variety of content. For example, in addition to the main or principal content, many web pages display content such as background imagery, advertisements, or navigation menus, headers/footers, and links to additional content, among others. This content will be referred to herein as auxiliary content.

Some of the content of a web page may be print worthy, but the user may not want to print some or all of the auxiliary content. In some cases, however, some of the auxiliary content may be relevant to the principal content such that the user may want to select that portion of the auxiliary content along with the principal content. Consequently, the present systems and methods offer selections of web page content based on the selections of previous users. Assuming that the current user wants to select the same "popular" content from the web page that previous users have selected, this allows the current user to more rapidly select the desired content on the web page for printing, viewing, archiving, or any other useful purpose.

In one example, a user operates a user interface on a computing device. The user interface provides an option to select a crowd consensus or popular content selection of a web page. When the user selects the crowd consensus or popular content selection, those portions that other users have selected are selected or presented to the user. This assists a user in printing or archiving desired portions of a web page and viewing these desirable portions on computing devices with smaller screens.

This is possible without extra programming or configuration to add new web sites or identify new web sites. Further, no cooperation is needed from the web site publisher, web page server administrator, or other party. Still further, as the examples of the present systems and methods are employed by more and more people, the web page data saved grows, and becomes more efficient to a user due to the refinement of the popular selection data stored therein.

In another example, the demographics of the user may be matched with other user's demographics. In this example, the crowd consensus or popular selection of those other users who match the user's demographics may be presented on the user's computing device. This provides for an even more specific and directed selection of content within a web page.

There are a number of challenges in selecting the desired portions of web pages. For example, web pages vary widely by type. Common types of web pages include: news, shopping, blog, map, and recipe web pages. The web page layouts also vary widely across the different types of web pages. The web pages also included a variety of content, including text, images, video, and Flash. To effectively select desired portions in a web page, a device may be utilized that determines popular selections of portions of a particular web page or similar web pages by a number of other users.

As used in the present specification and in the appended claims, the term "web page" is meant to be understood broadly as any document that can be retrieved from a server over a network connection and viewed in a web browser application. For example, a web page may be a document accessed by a Uniform Resource Locator (URL) on the World Wide Web over a network such as the Internet. Further, as used in the present specification and in the appended claims, the term "web page data" is meant to be understood broadly as any data relating to a web page. For example, web page data may include the web page's Uniform Resource Locator (URL); the web page's Document Object Model (DOM); information relating to the structure and layout of a Document Object Model (DOM) tree of the web page; the layout and structure of any nodes within the Document Object Model (DOM) tree; content of a web page or nodes previously or currently selected by a viewer within a Document Object Model (DOM) tree; content of a web page or nodes not previously or currently selected by a viewer within a Document Object Model (DOM) tree; any data relating to the amount or characteristics of any type of content of the web page selected or not selected by an individual, entity; or combinations of these. Web page data may additionally include any metadata associated with or describing any of the above mentioned types of data. Still further, web page data may also include any data or metadata relating not only to the content of a web page an individual has selected from any one web page in the past, but may also include information relating to when and how often the viewer had previously viewed, utilized, or adapted a web page or content on a web page.

Still further, as used in the present specification and in the appended claims, the term "similar web page" or similar language is meant to be understood broadly as any web page having similar characteristics as compared to another web page. For example, a similar web page may be similar in the type of template used to arrange the text, images or other content displayed on the web page. A similar web page may also be similar because, although the web page address or Uniform Resource Locator (URL) is not entirely identical, the domain name within the Uniform Resource Locator (URL) is the same. Additionally, a similar web page may be similar in the content displayed on the web page.

Additionally, as used in the present specification and in the appended claims, the term "user" is meant to be understood broadly as any person viewing or otherwise utilizing a web page. Therefore, an owner or administrator of a web page, a user of a computing system having accessed a web page, or any other person may be a viewer or user. Still further, as used in the present specification and in the appended claims, the term "user desirable content" is meant to be understood broadly as that content on a web page that a user or viewer wishes to view, utilize or adapt for any purpose. Indeed, the present specification may refer to "desirable" content within a web page that is meant to be understood as those sections of text, images, or any other content on a web page that the user may generally wish to view, utilize or adapt.

Still further, as used in the present specification and in the appended claims, the term "other users" or "crowd" is meant to be understood broadly as any number of people, including one person, other than the user as described above. Further, as used in the present specification and in the appended claims, the terms "crowd consensus" or "popular selection" are meant to be understood broadly as any method and associated algorithms that aggregate the statistical distribution of what parts of a web page have been selected previously, and determines what portions of the web page are considered to be most popular or are part of a consensus of one or more persons. For example, the crowd consensus or popular selection may be determined by a frequency count, a voting scheme, a weighted counting scheme, a ranking of a type of selection, or combinations thereof, among others. In one example, a crowd consensus or popular selection may be made by any number of persons including, for example, a user, other users, or combinations of these. Also, a crowd consensus or popular selection may be based on, for example, how often a portion of a web page was selected, what portion or portions of a web page were selected, how consistently a particular portion of a web page was selected, various types of statistical correlations between how related portions of a web page were selected, the weight of the portions of the web pages that were selected, a rank of a type of selection made within the web page, or combinations thereof, among others.

Even still further, as used in the present specification and in the appended claims, the term "sub-node" is meant to be understood broadly as any node within a Document Object Model (DOM) tree that has at least one node located on a higher level in the hierarchal order of the Document Object Model (DOM) tree. Therefore, a sub-node may be a sub-node of a node which itself is a sub-node. Additionally, a sub-node may also comprise a number of sub-nodes itself.

In the following description, for purposes of explanation, numerous specific details are set forth in order to provide a thorough understanding of the present systems and methods. However, the present apparatus, systems and methods may be practiced without these specific details. Reference in the specification to "an example" or similar language means that a particular feature, structure, or characteristic described in connection with the example is included in at least that one example, but not necessarily in other examples. The various instances of the phrase "in one example" or similar phrases in various places in the specification are not necessarily all referring to the same example.

Referring now to FIG. 1, an illustrative system (100) for selecting content within a web page (110) using a popular selection may include a client device (105) that has access to a web page (110) stored by a web page server (115). In the present example, for the purposes of simplicity in illustration, the client device (105) and the web page server (115) are separate computing devices communicatively coupled to each other through a mutual connection to a network (120). However, the principles set forth in the present specification extend equally to any alternative configuration in which a client device (105) has complete access to a web page (110). As such, alternative examples within the scope of the principles of the present specification include, but are not limited to, examples in which the client device (105) and the web page server (115) are implemented by the same computing device, examples in which the functionality of the client device (105) is implemented by multiple interconnected computers, for example, a server in a data center and a user's client machine, examples in which the client device (105) and the web page server (115) communicate directly through a bus without intermediary network devices, and examples in which the client device (105) has a stored local copy of the web page (110) that is to be analyzed to select the desirable content from the web page (110).

The client device (105) of the present example is a computing device that retrieves the web page (110) hosted by the web page server (115) and determines the most user desirable content of the web page (110) based, at least partially, on a popular selection by other users' or a "crowd's" previous selections of text, images, and other content on other web pages. In the present example, this is accomplished by the client device (105) requesting the web page (110) from the web page server (115) over the network (120) using the appropriate network protocol (e.g., Internet Protocol ("IP")), and requesting web page data from a popular selection data storage device (117). Illustrative processes for identifying the most user desirable content of the web page (110) are set forth in more detail below.

To achieve its desired functionality, the client device (105) includes various hardware components. Among these hardware components may be at least one processor (125), at least one data storage device (130), peripheral device adapters (135), and a network adapter (140). These hardware components may be interconnected through the use of one or more busses and/or network connections. In one example, the processor (125), data storage device (130), peripheral device adapters (135), and a network adapter (140) may be communicatively coupled via bus (107).

The processor (125) may include the hardware architecture for retrieving executable code from the data storage device (130) and executing the executable code. The executable code may, when executed by the processor (125), cause the processor (125) to implement at least the functionality of retrieving the web page (110) and analyzing a web page (110) in order to locate the most user desirable content of the web page (110) according to the methods of the present specification described below. In the course of executing code, the processor (125) may receive input from and provide output to one or more of the remaining hardware units.

In one example, the client device (105), and, specifically, the processor (125) accesses a web page and presents a web page to a user via a web browser program stored and executed on the client device (105). The processor (125) presents to the user a user interface on an output device (150) of the client device (105). As discussed above, the user interface provides a user with an option to select a crowd consensus or popular selection of a web page. When the user selects the crowd consensus or popular selection, those portions that other users have selected, and that the computing device or other device has determined is a crowd consensus or popular selection of that web page or a similar web page is presented to the user.

The data storage device (130) may store data such as web page data that is processed and produced by the processor (125). As will be discussed, the data storage device (130) may specifically save web page data including, for example, a web page's Uniform Resource Locator (URL), Document Object Model (DOM) tree, popular selections of content in a web page, and sections of content in a web page a user has selected. All of this data may further be stored in the form of a database for easy retrieval when the same or a similar web page is once again accessed by a user.

The data storage device (130) may include various types of memory modules, including volatile and nonvolatile memory. For example, the data storage device (130) of the present example includes Random Access Memory (RAM), Read Only Memory (ROM), and Hard Disk Drive (HDD) memory. Many other types of memory are available in the art, and the present specification contemplates the use of many varying type(s) of memory (130) in the data storage device (130) as may suit a particular application of the principles described herein. In certain examples, different types of memory in the data storage device (130) may be used for different data storage needs. For example, in certain examples the processor (125) may boot from Read Only Memory (ROM), maintain nonvolatile storage in the Hard Disk Drive (HDD) memory, and execute program code stored in Random Access Memory (RAM).

Generally, the data storage device (130) may comprise a computer readable storage medium. For example, the data storage device (130) may be, but not limited to, an electronic, magnetic, optical, electromagnetic, infrared, or semiconductor system, apparatus, or device, or any suitable combination of the foregoing. More specific examples of the computer readable storage medium may include, for example, the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The hardware adapters (135, 140) in the client device (105) enable the processor (125) to interface with various other hardware elements, external and internal to the client device (105). For example, peripheral device adapters (135) may provide an interface to input/output devices, such as, for example, output device (150), to create a user interface and/or access external sources of memory storage, such as, for example, popular selection data storage device (117). As will be discussed below, an output device (150) may be provided to allow a user to interact with and adjust the amount and type of content selected within a web page (110).

Peripheral device adapters (135) may also create an interface between the processor (125) and a printer (145) or other media output device. For example, where the client device (105) selects user desirable content of the web page (110) and the user then wishes to print that content, the client device (105) may instruct the printer (145) to create one or more physical copies of the document. A network adapter (140) may additionally provide an interface to the network (120), thereby enabling the transmission of data to and receipt of data from other devices on the network (120), including the web page server (115).

The popular selection data storage device (117) may be any data storage device that stores web page data associated with popular selections of web page content of a number of web pages. The network (120) may comprise two or more computing devices communicatively coupled. For example, the network (120) may include a local area network (LAN), a wide area network (WAN), a virtual private network (VPN), and the Internet, among others.

Figure 2:
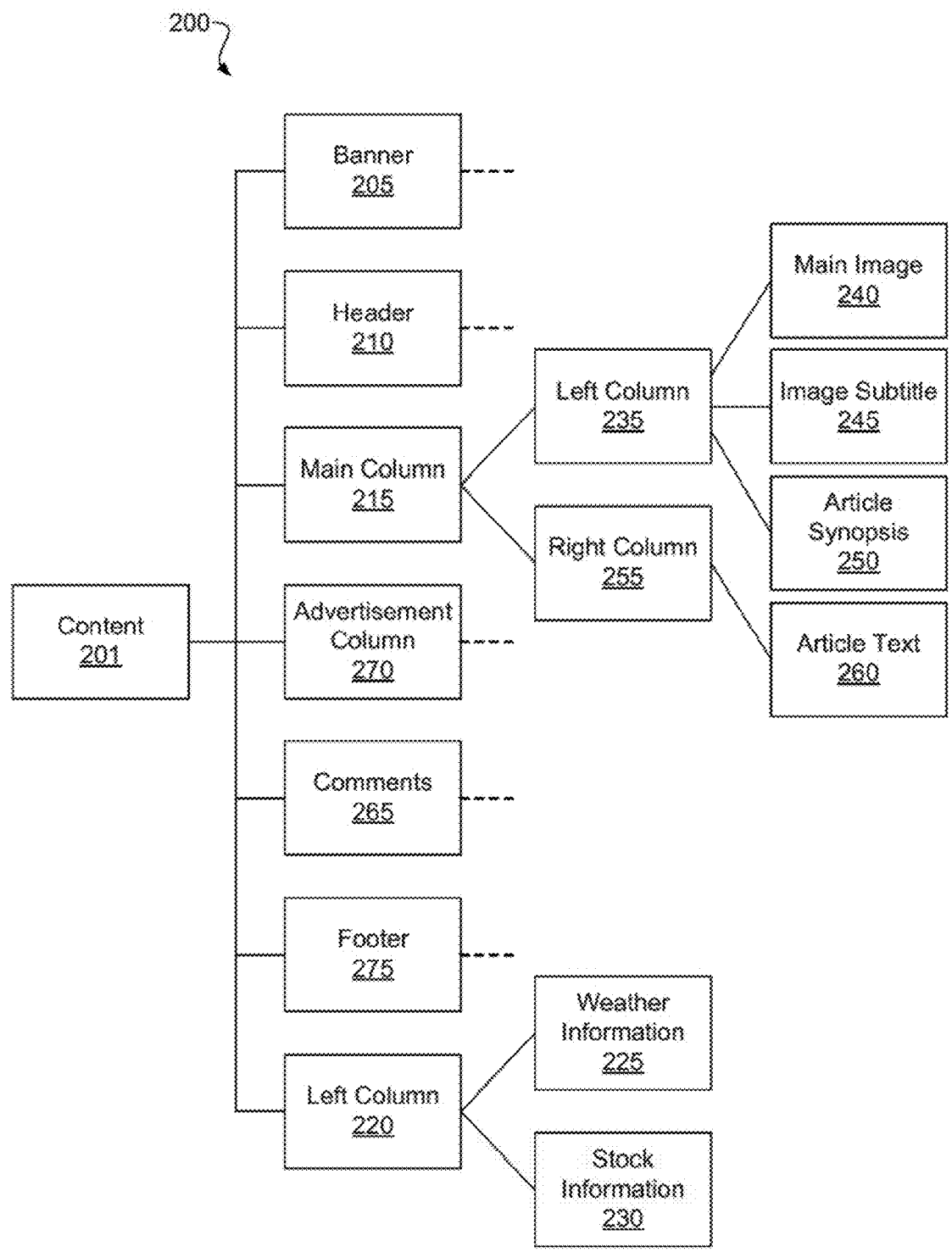
FIG. 2 is a diagram of an illustrative system for selecting content within a web page using a popular selection, according to one example of principles described herein.
Figure 3:
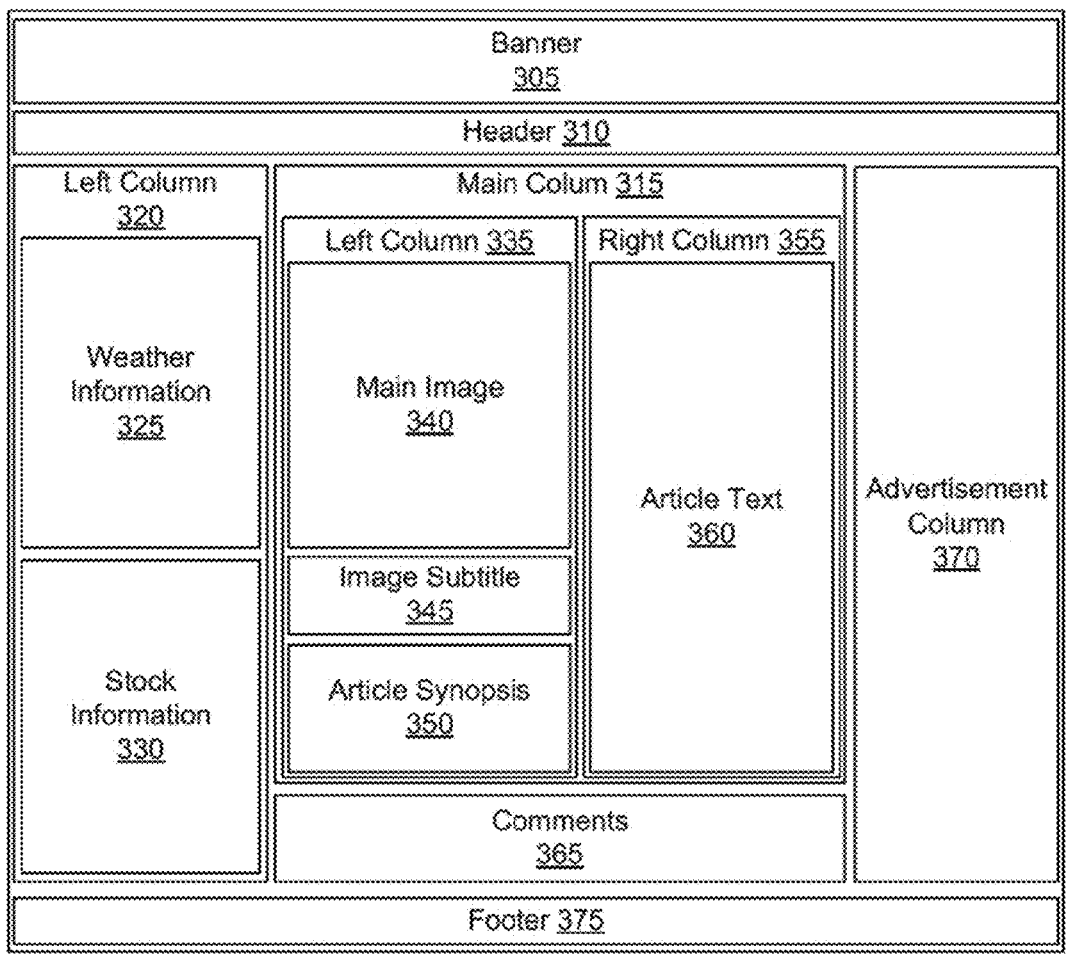
FIG. 3 is a layout of an illustrative web page that corresponds to the Document Object Model (DOM) tree of FIG. 2, according to one example of principles described herein.
Figure 4:
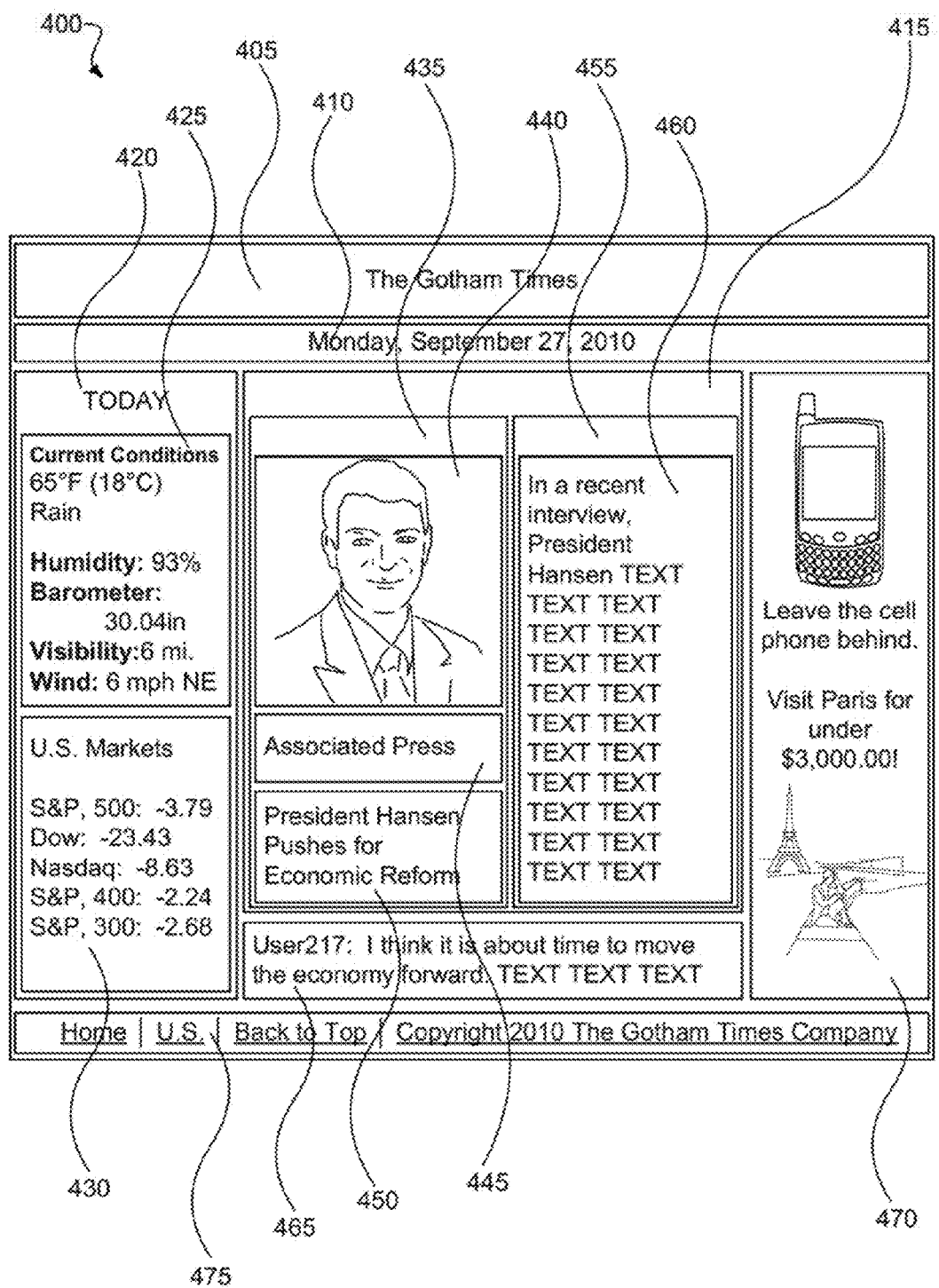
FIG. 4 is an illustrative diagram of a web page showing the content of the web page corresponding to the Document Object Model (DOM) tree of FIG. 2 and the layout of the web page of FIG. 3, according to one example of principles described herein.

FIG. 2 is a simplified partial representation of a Document Object Model (DOM) tree, FIG. 3 layout of an illustrative web page that corresponds to the Document Object Model (DOM) tree of FIG. 2, and FIG. 4 is a diagram of a web page showing the content of the web page corresponding to the Document Object Model (DOM) tree of FIG. 2 and the layout of the web page of FIG. 3. As discussed earlier, various types of data associated with a web page may exist. This data may be saved in order to better select the user desirable content of a web page. However, for purposes of explanation, the present specification uses the illustrative example of saving a Uniform Resource Locator (URL), the web page associated with the Uniform Resource Locator (URL), the web page's Document Object Model (DOM) tree, the particular nodes selected by a user or other users, or combinations thereof. Therefore, although the illustrative example in the present specification and specifically in FIGS. 2-4 may refer to these types of data being saved in order to better select the appropriate user desirable content from a web page, it can be appreciated that any type of web page data may also be saved so as to achieve similar results. For example, any representation of a web page Document Object Model (DOM) tree, any transformation of a web page Document Object Model (DOM) tree, a replacement of DOM strings with some reduced representation such as, for example, a character count or a secure cryptographic hash, any modifications of a previous Document Object Model (DOM) tree, or any other type of data representing any content on any web page that has been previously selected by a user may be saved.

In the example shown in FIGS. 3-4, the web page is from an online news website and includes, for example, an image of a person, an article associated with the person, weather information, stock information, an advertisement, a comments section, among other elements.

FIG. 2 is an illustrative Document Object Module (DOM) tree (200) showing the hierarchy of Document Object Module (DOM) nodes in the illustrative web page. A Document Object Module (DOM) is a cross-platform and language independent convention for representing and interacting with web page elements in HyperText Markup Language (HTML), eXensible HyperText Markup Language (XHTML) and eXensible Markup Language (XML). The root node in this illustrative web page is the Content (201) node that has seven sub-nodes: the Banner (205) sub-node; Header (210) sub-node, Main Column (215) sub-node; Advertisement Column (270) sub-node; Comments (265) sub-node; Footer (270) sub-node, and the Left Column (220) sub-node. For purposes of illustration, sub-nodes (235-255) are shown for the Main Column (215) sub-node and the Left Column (220) sub-node. It can be appreciated that the Banner (205) sub-node, Header (210) sub-node, Advertisement Column (270) sub-node, Comments (265) sub-node, and Footer (270) sub-node may each include additional sub-nodes of their own. Dashed lines extending to the right of the other sub-nodes, therefore, show the continuation of the sub-nodes with nodes that are not illustrated in FIG. 2.

The Main Column (215) sub-node also includes two sub-nodes itself, Left Column (235) sub-node and Right Column (255) sub-node, at the next hierarchal level. Left Column (235) sub-node has three sub-nodes at the lowest hierarchal level: Main Image (240) sub-node, Image Subtitle (245) sub-node, and Article Synopsis (250) sub-node. The Right Column (255) sub-node has one sub-node at the lowest hierarchal level: Article Text (260) sub-node.

FIG. 3 depicts the layout (300) of the illustrative web page depicted by the Document Object Module (DOM) tree (FIG. 2, 200) shown in FIG. 2. The Banner (305) holds a location within the layout (300) of a banner or other title. The Advertisement Column (370) holds a location within the layout (300) for advertisements. The Header (310) may contain a number of elements including dates, search fields, and other sub-elements. Similarly, the Footer 375) may contain a number of elements including navigation tabs, links to related sites, terms of use and privacy policies, copyright notices, and other elements. The Comments (265) section may contain ratings and comments from various users of the site who, for example want to leave a comment regarding the article. However, as explained above, for simplicity these elements within the Banner (305), Advertisement Column (370), Header (310), Footer (375), and Comments (265) are not represented on the Document Object Model (DOM) tree of FIG. 2 and therefore also do not appear in the web page layout of FIG. 3.

The Main Column (315) sub-node contains at least some of the user desirable content that a user may typically want to view, utilize or adapt. The Main Column (315) sub-node contains a Left Column (335) and a Right Column (355). In the Left Column (335), an image is shown in the Main Image (340) section; in this illustrative example the image is a person. The Left Column (335) may also include an Image Subtitle (345) and an Article Synopsis (350). The Right Column (355) includes Article Text (360). A Comments (365) section may also be included in the layout (300). The layout (300) may further include a Left Column (320) that may include other user-desirable content such as the Weather information (325) section and the Stock Information (320) section. Each of these elements (205-275) may have any number of additional sub-elements within the layout (300) of the web page, and may have corresponding nodes within the Document Object Module (DOM) tree (200).

FIG. 4 is diagram of an illustrative web page (400) showing the content of the web page of FIGS. 2 and 3. The content has been simplified for purposes of illustration. There may be a variety of non-visual code and/or elements present in any of the elements (FIG. 3, 205-275). However, according to one aspect of the present systems and methods, this non-visual information is not presented to the user viewing the web page (400) as being part of the user desirable content. Consequently, during the analysis of the web page (400) to determine the user desirable content of the web page (400), non-visual information is not weighted heavily or is not considered at all. As discussed above the user is typically interested in viewing, utilizing, or adapting in some way portions of the web page (400). Advertisements, page navigation, reviews, comments, and links typically contain information that is not directly relevant to the user's interest in the web page (400) and are not directly related to the content the user wishes to view, utilize or adapt.

Figure 5:
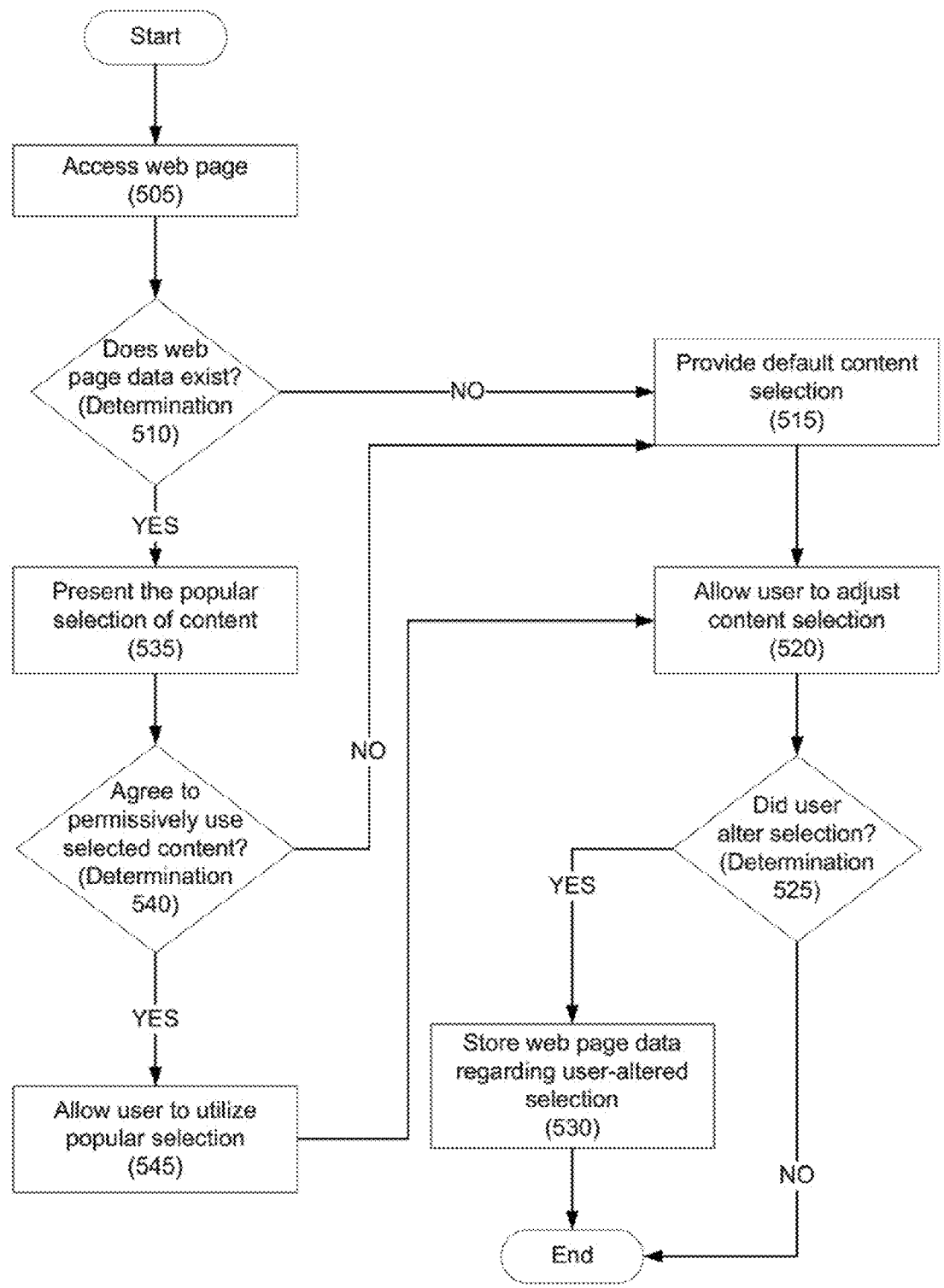
FIG. 5 is a flowchart depicting a method for selecting content within a web page using a popular selection, according to one example of the principles described herein.

Turning now to FIG. 5, an illustrative flowchart depicting a method for selecting content within a web page using a popular selection is shown. The method may start by accessing or downloading a web page (505) to a client device (FIG. 1, 105) operated by a user of a website. Accessing a web page may be accomplished with a web browser program stored and executed on a computer device such as the client device (105) of FIG. 1. As discussed earlier, the client device may retrieve the web page hosted by the web page server (FIG. 1, 115), and determine the most user desirable content of the web page based, at least partially, on a popular selection of text, images and other content on other web pages. In the present example, access to the web page is accomplished by the client device (FIG. 1, 185) requesting the web page from the web page server over the network (FIG. 1, 120) using the appropriate network protocol, for example, Internet Protocol (IP).

Next, it may be determined whether any web page data exists (Determination 510). In one example, it may be determined if web page data has been saved on the popular selection data storage device (FIG. 1, 117) that is similar to the web page data of the web page being accessed at that time by the user (Determination YES, 510). The client device may than access any saved data on the popular selection data storage device (FIG. 1, 117) to determine whether the web page data of the web page (FIG. 4, 400) currently being accessed matches or is at least similar to any other previously accessed web page's web page data. As discussed previously, the web page data may come in the form of a Uniform Resource Locator (URL), a Document object Model (DOM) tree, or any other type of web page data and may be stored and accessed in a way so as to be compared with any other web page data associated with other accessed web pages.

If web page data associated with the currently viewed web page (FIG. 4, 400) or web page data similar to the currently viewed web page (FIG. 4, 400) does not exist (Determination NO, 510) in the popular selection data storage device (FIG. 1, 117), then the client device (FIG. 1, 105) may provide a default content selection to a user (515). In one example, this may be performed by the client device.

Figure 8:
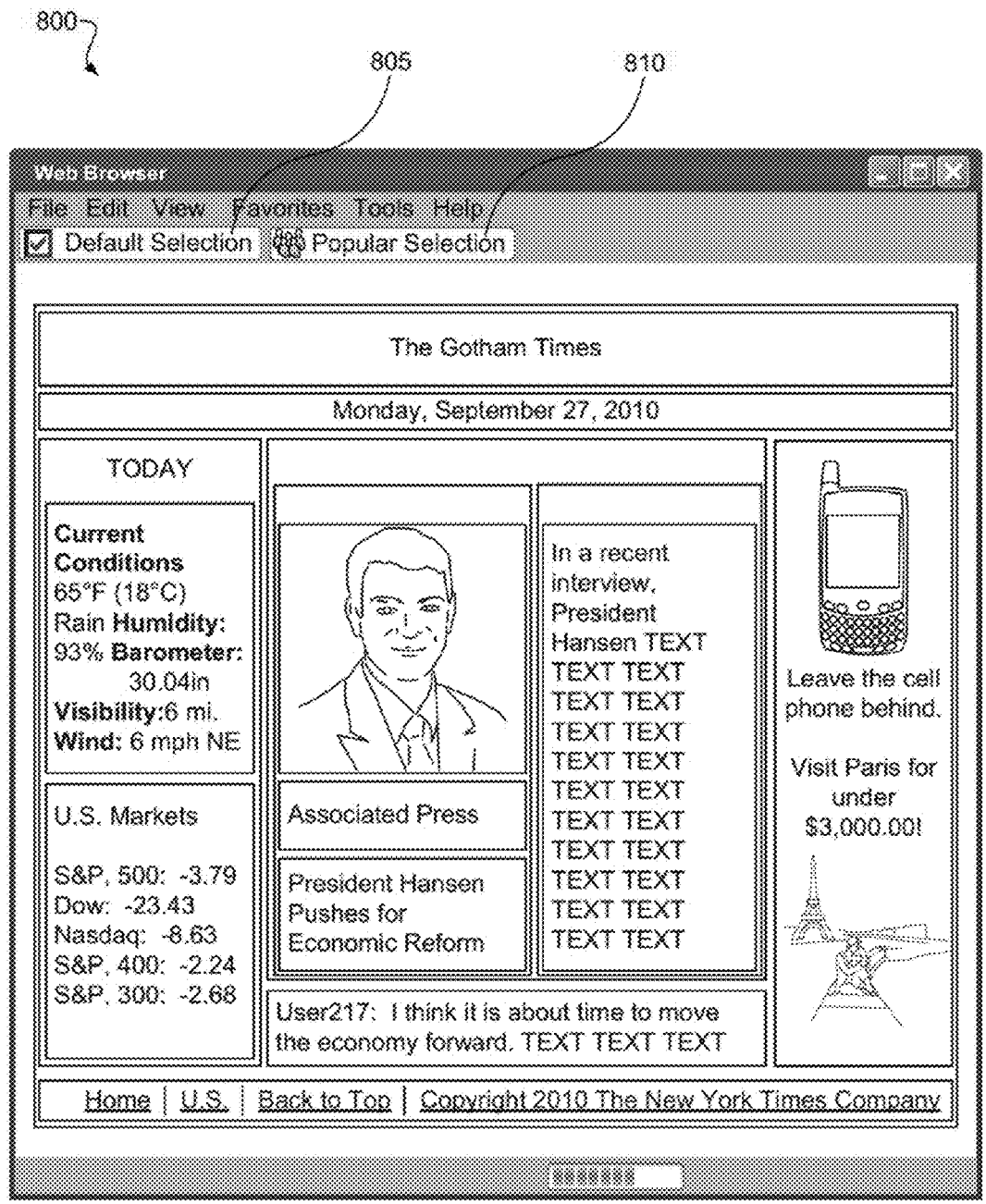
FIG. 8 is an illustrative diagram of a web browser presenting the web page of FIG. 4, according to one example of principles described herein.
Figure 9:
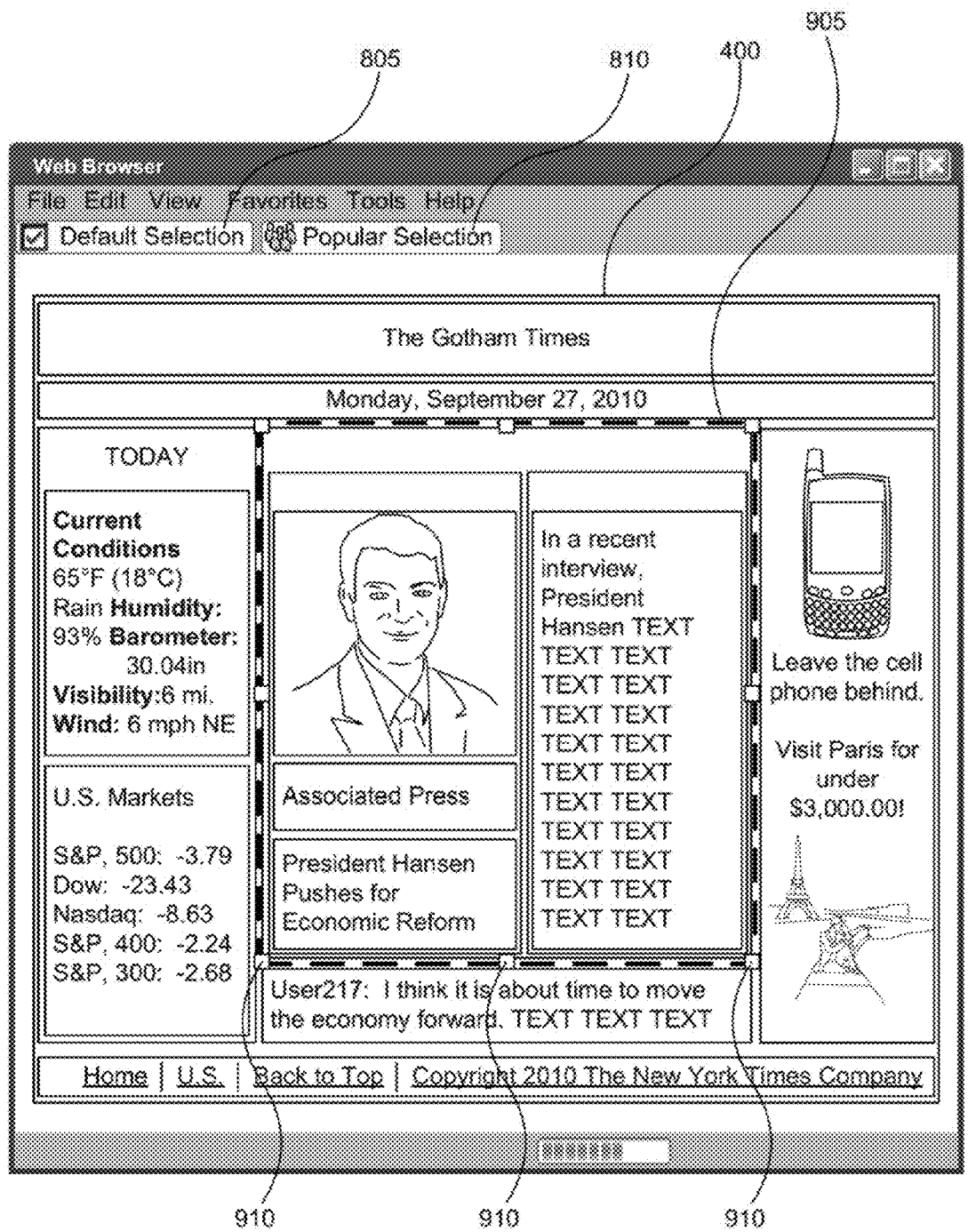
FIG. 9 is an illustrative diagram of the web browser of FIG. 8 depicting the default selection of portions of the web page of FIG. 4, according to one example of principles described herein.
Figure 10:
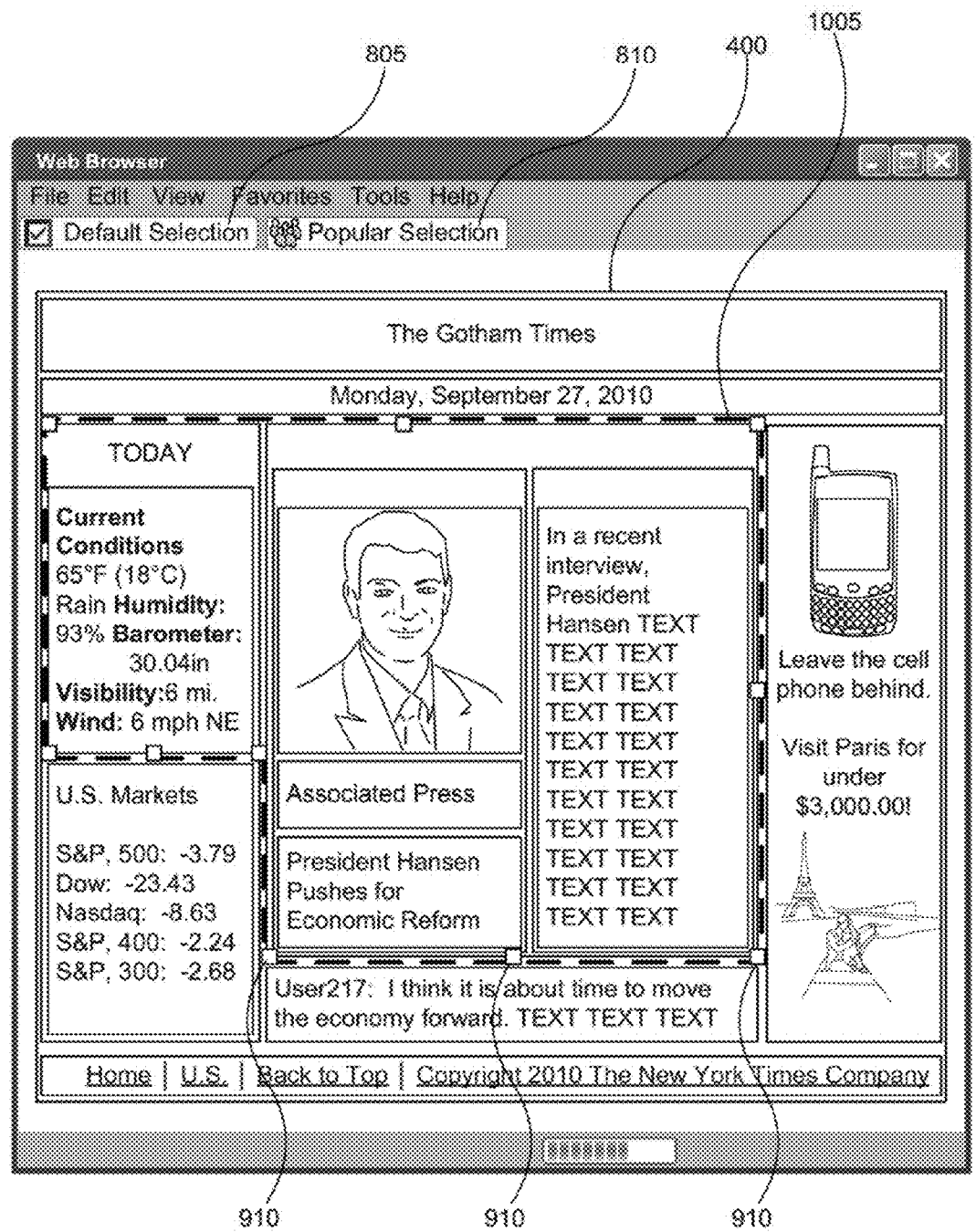
FIG. 10 is an illustrative diagram of the web browser of FIG. 8 depicting the popular selection of portions of the web page of FIG. 4, according to one example of principles described herein.

In another example, a default selection button (805) may be provided to the user on a web browser. FIG. 8 is a diagram of a web browser (800) presenting the web page (400) of FIG. 4, and FIG. 9 is a diagram of the web browser (800) of FIG. 8 depicting the automatic default selection (905) of portions of the web page (400) of FIG. 4. As depicted in FIG. 8, the web browser (800) may comprise a default selection button (805) and a popular selection button (810) as additional buttons integrated with the web browser program, or available to a user as a toolbar as depicted in FIGS. 8-10. The popular selection button (810) will be discussed in more detail below in connection with a popular selection of content. The user may, after the web browser (800) has uploaded the web page (400), select the default selection button (805) to instruct the client device (FIG. 1, 105) to present a default content selection to the user.

Whether default content selection is performed with or without user selecting the default selection button (805), in one example, the client device may perform a content search of the web page to present a preliminary selection of user desirable content (515). Content selection may be performed via a number of methods; however, in one example a method of selecting content may be implemented by the client device (FIG. 1, 105) to select the most user desirable portions of the web page (FIG. 4, 400)

One method of selecting user desirable content from a web page (FIG. 4, 400) may include, first, segmenting the web page (FIG. 4, 400) into several coherent areas or blocks. For example, the client device (FIG. 1, 105) may access the source code of the web page (FIG. 4, 400) to determine or create a Document Object Model (DOM) tree (FIG. 2, 200) for the web page (FIG. 4, 400), gather information about each node on the Document Object Model (DOM) tree, and segment the web page (FIG. 4, 400) into coherent areas or blocks. The client device (FIG. 1, 105) may also eliminate or filter out any invisible elements of the web page (FIG. 4, 400) that may not need to be included with the main content of the web page (FIG. 4, 400).

The client device (FIG. 1, 105) may then calculate a score for each area or block based on many features of the web page (FIG. 4, 400). For example, a score may be calculated based on the horizontal and vertical coverage of each block, the normalized text length within each block, the link-to-text ratio within each block, the ratio of non-highlighted text to highlighted text within each block, the normalized block area, and the normalized number of any child Document Object Model (DOM) nodes within each block. The horizontal coverage may be obtained by computing the horizontal extent of a segment over the total area of the web page (FIG. 4, 400). The blocks covering near the horizontal center may receive higher scores. Similarly, the vertical coverage may be obtained by computing the vertical extent of a segment over the total area of the page. The blocks covering near the top of the web page (FIG. 4, 400) may also receive higher scores. The normalized text length may be obtained by computing the text length of the segment over the maximal text length of all segments. The link-to-text ratio may be obtained by computing the link text length of the segment over the text length of the segment. Texts with higher density of anchor text are more likely to be a navigational bar or an advertisement, and, therefore, may be given a lower score. Similarly, the non-highlighted text to highlighted text ratio may be obtained by computing the highlight text length of the segment over the text length of the segment and then multiplying the highlight weight. For example, the weight of <H1> is larger than <H6>. The normalized block area may be obtained by computing the segment area over the maximal area of all segments. Next, the normalized number of child (DOM) nodes may be obtained by computing the number of child nodes in the segment over the maximal number of child nodes in all segments.

Next, the client device (FIG. 1, 105) may determine which areas or blocks have received the highest score and present those areas with the highest score via a user interface such as a monitor. In one example, the score may be high enough to overcome a predetermined threshold limit. This threshold may, in one example, be set by the user. The default content is then selected without any user interaction. Therefore, the selection of these portions of the web page (FIG. 4, 400) may be performed in the background while the web page (FIG. 4, 400) is being accessed by the user, or may be performed upon a user selection of the default selection button (805).

After the client device (FIG. 1, 105) has performed a search of the web page (FIG. 4, 400) to present a default selection of web page content, the user may then be allowed to adjust the amount of content to be selected (520) within the web page. Still referring to FIG. 5 and now turning to FIG. 9, a diagram of the web browser (800) of FIG. 8 depicting the default selection (905) of portions of the web page (400) of FIG. 4 is shown. In addition to the selected default content (905) of the web page (400), the user may select additional content.

In one example, this may be done by clicking on and dragging a number of control points (910) located around or otherwise associated with the selected default content (905) shown on the user interface of the client device (FIG. 1, 105). In this manner, the user may include additional content to the selected default content (905) of the web page (400) by dragging, for example, a corner or side control point (910) of the selected default content (905) over additional portions of the web page (FIG. 4, 400). Further, the user may restrict the amount of content included in the selected default content (905) by dragging the control points (910) off of portions of the selected default content (905) of the web page (400).

In another example, the user may be allowed to drag a cursor over additional portions of the web page (400) so as to further select a separate portion of the web page (400) that is not close to the selected default content (905). For example, expansion of the selected main content (290) of the web page may result in content that the user may not wish to include, but does include if the user is dragging a control point (410) over the unwanted content. In this case, the user may create a new block or section within the content of the web page (FIG. 4, 400) separate and distinct from the selected default content (905) while still excluding those undesirable sections positioned between those two sections of content. Therefore, this addition and subtraction of the selected portions within the web page (FIG. 4, 400) provides for a more effective and uses-friendly means of selecting those desirable portions of the web page (FIG. 4, 400).

Looking at FIG. 5 again, the method may further include saving any target web page data to a database (530) thereby allowing easy access to the web page data by a processor (FIG. 1, 125) when the user accesses the web page (FIG. 4, 400) or a web page similar to that web page (FIG. 4, 400). The client device (FIG. 1, 105) may determine whether the user altered the selected default content (905) (Determination 525). If the user did not alter the selected default content (905) (Determination NO, 525), then the process terminates. However, if the user did alter the selected default content (905) (Determination YES, 525), then the web page data associated with the user-altered selection is stored (530) for later use by the user and other users who may wish to select the same portions of the web page (FIG. 4, 400) as the user-altered selection.

As discussed above the web page data may be any type of data associated with the web page that allows a client device to select those user desirable portions of a web page. For example, web page data may include the web page's Uniform Resource Locator (URL); the web page's Document Object Model (DOM); information relating to the structure and layout of a Document Object Model (DOM) tree of the web page; the layout and structure of any nodes within the Document Object Model (DOM) tree; content of a web page or nodes previously or currently selected by a user within a Document Object Model (DOM) tree; content of a web page or nodes not previously or currently selected by a user within a Document Object Model (DOM) tree; any data relating to the amount or characteristics of any type of content of the web page selected or not selected by an individual, entity; or combinations of these. Web page data may additionally include any metadata associated with or describing any of the above mentioned types of data. Still further, web page data may also include any data or metadata relating not only to the content of a web page an individual has selected from any one web page in the past, but may also include information relating to when and how often the user had previously viewed, utilized, or adapted a web page or content on a web page.

The information stored in, for example, the popular selection data storage device (FIG. 1, 117), may then be retrieved again at a later time by, for example, the processor (FIG. 1, 125) located on the client device (FIG. 1, 105) so as to better select that user desired content of the web page based on those portions of the web page selected by those user's who have accessed the web page (FIG. 4, 400). Therefore, if the user had previously accessed the web page and web page data relating that web page does exist (Determination YES, 510), then the client device (FIG. 1, 105) may present the popular selection of content to the user (535). In one example, presenting the popular selection of content to the user (535) may be performed by the client device (FIG. 1, 105). In another example, presenting the popular selection of content to the user (535) may be performed after a user requests the client device (FIG. 1, 105) to do so. This may be accomplished by the user selecting the popular selection button (810) associated with the web browser (800).

While still referring to FIG. 5 and now turning to FIG. 10, a diagram of the web browser (800) of FIG. 8 depicting the popular selection (1005) of portions of the web page (400) of FIG. 4 is shown. In the example depicted in FIG. 10, portions of the web page (400) associated with the weather information as well as a main article may be selected by the client device (FIG. 1, 105). The popular selection may be performed by, for example, the client device (105) of FIG. 1. The client device (FIG. 1, 105) may query the popular selection data storage device (117) to determine if there exists a crowd consensus of a popular selection of the web page (400) that the user is currently viewing. In one example, the client device (FIG. 1, 105) may first determine if enough other users have made selections of portions of that web page (400). For example, the client device (FIG. 1, 105) may wait until at least ten other users have made selections within that web page (400) before a crowd consensus is provided to the client device (FIG. 1, 105). In another example, the threshold number of times that web page (400) selections have been made may be set by a user. In both of these examples, the threshold number of times that web page (400) selections have been made may be any number of other users' selections including at least one other user's selection of portions of that web page (400).

Once the client device (FIG. 1, 105) determines that enough other users have made selections of portions of that web page (FIG. 4, 400), then the client device may then determine if enough other users in the crowd have made selections of portions of that web page within a predetermined variance. As described above, the crowd consensus or popular selection may be determined by any method and associated algorithms that aggregate the statistical distribution of what parts of a web page have been selected previously, and determines what portions of the web page are considered to be most popular or are part of a consensus of one or more persons. These methods of determining the crowd consensus or popular selection may be based on, for example, using a frequency count, a voting scheme, a weighted counting scheme, a ranking of type of selection, or combinations thereof, among others.

In one example, the client device (FIG. 1, 105) may determine, among all the instances of other users' selections, how many times a particular node (FIG. 2, 205-275) has been selected. After determining how many times the nodes of the web page (FIG. 4, 400) have been selected individually, the client device (FIG. 1, 105) may then present the most selected nodes as the popular selection of content within the web page (FIG. 4, 400). In this example, other users may have selected the portion of the web page (FIG. 4, 400) correlating to the Main Column (FIG. 2, 215) and all the sub-nodes associated with the Main column node (FIG. 2, 235-255) forty times. In this same example, other users may have selected the portion of the web page correlating to the Comments (265) node only ten times, and the Advertisement Column (270) node only 5 times. Thus, the Main Column (FIG. 2, 215) and all the sub-nodes associated with the Main column node (FIG. 2, 235-255) are presented to the user as the popular selection because the portions of the web page associated with these nodes were selected most by other users.

In another example, the selection of the most popular portions of the web page (FIG. 4, 400) may be performed using a threshold. In this example, portions of the web page associated with particular nodes are selected at least a threshold amount of times. Again, this threshold may be predetermined by the client device (FIG. 1, 105), or may be selected by the user. For example, if a portion of the web page (FIG. 4, 400) associated with particular node is selected by other users at least ten times, then that portion of the web page is presented to the user as a popular selection.

In another example, the selection of the most popular portions of the web page (FIG. 4, 400) may be performed using a fraction of times a particular portion of the web page (FIG. 4, 400) was selected. In this example, if a particular node or other portion of the web page has been selected a number of times more than other portions of the web page above a predetermined fraction, then that portion of the web page is presented to the user as a crowd consensus or popular selection. In one example, the fraction may be higher than about 0.8. In another example, the fraction may be higher than about 0.6.

Further, in yet another example, the selection of the most popular portions of the web page (FIG. 4, 400) may be performed using a variance of a selection of a portion of the web page (FIG. 4, 400). In this example, it is determined how consistently a particular node or portions of the web page (FIG. 4, 400) is selected. In still another example, the selection of the most popular portions of the web page (FIG. 4, 400) may be performed using correlations between how related nodes or portions of the web page (FIG. 4, 400) are selected.

In one example, throughout the process described in FIG. 5 and the processes described below in FIGS. 6 and 7, a user interface such as the web browser (800) depicted in FIG. 8 may be provided. As discussed above, the user interface provides a user with an option to select a crowd consensus or popular selection of a currently viewed web page by selection of a popular selection button (810). Once a user selects the popular selection button (810), a user may be presented with a popular selection of content (FIG. 5, 535) of the currently viewed web page. Upon the provision of a popular selection of content to a user, the client device (FIG. 1, 105) or other computing device within the system (100) of FIG. 1 may prompt the user to agree to the use of his or her selected content (FIG. 5, 540) for one or more web pages (FIG. 4, 400) the user accesses, including the currently accessed web page. For example, the system (FIG. 1, 100) may provide a user interface, including a modal window, that explains to the user that the user may only utilize the popular selection of content if the user also agrees to provide or otherwise allow the system (FIG. 1, 100) to use the user's future web page content selection. In this example, the user is given a preview of the popular selection of content within the web page (FIG. 5, 535), and then asked to agree to the collection of the user's future web page content selections (FIG. 5, 540) in exchange for the client's use of the popular selection of content within the currently viewed web page. If the user does not to agree, then the system is configured to provide the user with a default selection of web page content, and may be configured to restrict the user's access to a popular selection of web page content. If the user agrees, then the system is configured so the user may utilize the popular selection of portions of the currently viewed web page. In this manner, a user may be enticed or encouraged to agree to the use of the user's future web page content selections. This may, in turn, provide for a larger pool of crowd consensus or popular selection of the currently viewed web page as well as other web pages.

In prompting the user to agree to the use of his or her selected content of web pages, a license agreement may also be presented to the user, via, for example, user interface (such as a modal window). The user may or may not agree with the license agreement. In one example, if the user decides not to agree to the license terms (Determination NO, 540), then the system is configured to provide the user with the default selection (905) of web page content (515), and may be configured to restrict the user's access to a popular selection of web page content (1005). However, if the user agrees to the license (Determination YES, 540), then the system is configured so that the user may utilize the popular selection of portions of the currently viewed web page. Also, if the user agrees to the license (Determination YES, 540), then the user's future web page content selection may be sent to the popular selection data storage device (FIG. 1, 117) for storage and for use by the user and other users in the future. These future web page content selections may include selections of a web page that the user makes without the assistance of a default selection (905) of web page content and a popular selection of web page content (1005) as well as content selections made in block 520 of FIG. 5.

In addition to the popular selection of content (1005) of the web page (400), the user may select additional content, or otherwise adjust the popular selection of content (FIG. 5, 520). With reference to FIG. 10, in one example, this may be done by clicking on and dragging a number of control points (910) located around or otherwise associated with the popular selection of content (1005) shown on the user interface of the client device. In this manner, the user may include additional content to the popular selection of content (1005) of the web page (400) by dragging, for example, a corner or side control point (910) of the popular selection of content (1005) over additional portions of the web page (400). Further, the user may restrict the amount of content included in the popular selection of content (1005) by dragging the control points (910) off of portions of the popular selection of content (1005) of the web page (400).

In another example, the user may be allowed to drag a cursor over additional portions of the web page (400) so as to further select a separate portion of the web page (400) that is not close to the popular section of content (1005). For example, expansion of the popular selection of content (1005) of the web page may result in content that the user may not wish to include, but does include if the user is dragging a control point (410) over the unwanted content. In this case, the user may create a new block or section within the content of the web page (400) separate and distinct from the popular selection of content (1005) while still excluding those undesirable sections positioned between those two sections of content. Therefore, this addition and subtraction of the selected portions within the web page provides for a more effective and user-friendly means of selecting those desirable portions of the web page (400).

Looking at FIG. 5 again, the method may further include saving any target web page data to a database (530) thereby allowing easy access to the web page data by a processor (FIG. 1, 125) when the user accesses the web page (FIG. 4, 400) or a web page similar to that web page (FIG. 4, 400), The client device (FIG. 1, 105) may determine whether the user altered the popular selection of content (1005) (Determination 525). If the user did not alter the popular selection of content (1005) (Determination NO, 525), then the process terminates. However, if the user did alter the popular selection of content (1005) (Determination YES, 525), then the web page data associated with the user-altered selection is stored (530) for later use by the user and other users who may wish to select the same portions of the web page (FIG. 4, 400) as the user-altered selection.

As similarly discussed above, the webpage data may be any type of data associated with the web page that allows a client device to select those user desirable portions of a web page. For example, web page data may include the web page's Uniform Resource Locator (URL); the web page's Document Object Model (DOM); information relating to the structure and layout of a Document Object Model (DOM) tree of the web page; the layout and structure of any nodes within the Document Object Model (DOM) tree; a replacement of DOM strings with some reduced representation such as, for example, a character count or a secure cryptographic hash, content of a web page or nodes previously or currently selected by a user within a Document Object Model (DOM) tree; content of a web page or nodes not previously or currently selected by a user within a Document Object Model (DOM) tree; any data relating to the amount or characteristics of any type of content of the web page selected or not selected by an individual, entity; or combinations of these. Web page data may additionally include any metadata associated with or describing any of the above mentioned types of data. Still further, web page data may also include any data or metadata relating not only to the content of a web page an individual has selected from any one web page in the past, but may also include information relating to when and how often the user had previously viewed, utilized, or adapted a web page or content on a web page.

In another example, if the user accepts the popular selections initially presented to the user without altering the selected portions, then client device (FIG. 1, 105) may save web page data to the popular selection data storage device (FIG. 1, 117) describing acceptance of the popularly selected portions. Therefore, the popularly selected portions of the web page may be given more weight when presenting those same portions to the user or another user in the future. In this manner, portions of a web page that represent the most user desirable content in that web page may be presented to future users accessing the web page.

Web page data associated with the future web page content selections made by the user may be transmitted to and saved by the popular selection data storage device (FIG. 1, 117) in an anonymous manner, and in accordance with established privacy laws of various jurisdictions. In one example, in order to preserve anonymity with respect to the user, data may be sent to the popular selection data storage device (FIG. 1, 117) that does not include text or URLs as part of the web data. Instead, in one example, a tree structure of the DOM tree may be sent where each content string is replaced with some reduced representation such as a simple character count or a secure cryptographic hash. Further, in one example, web page data may be transmitted to and saved by the popular selection data storage device (FIG. 1, 117) based on explicitly granted user permissions. In this example, the user's selections made in web pages and other user's selections made in web pages may be saved in the popular selection data storage device (FIG. 1, 117). As the examples of the present systems and methods are employed by more and more people, the web page data saved within the popular selection data storage device (FIG. 1, 117) grows, and becomes more efficient to a user due to the refinement of the popular selection data stored therein.

Before moving on to other examples, it may be noted that the above example with relation to FIG. 5 may include one or more aspects of the following examples, and, likewise, the following additional examples may include aspects of the example of FIG. 5. Further, aspects of the various examples disclosed herein may be combined with or added to the aspects of other various examples disclosed herein. Still further, in order to focus on certain aspects of the following examples, details disclosed in the example of FIG. 5 may be excluded.

Figure 6:
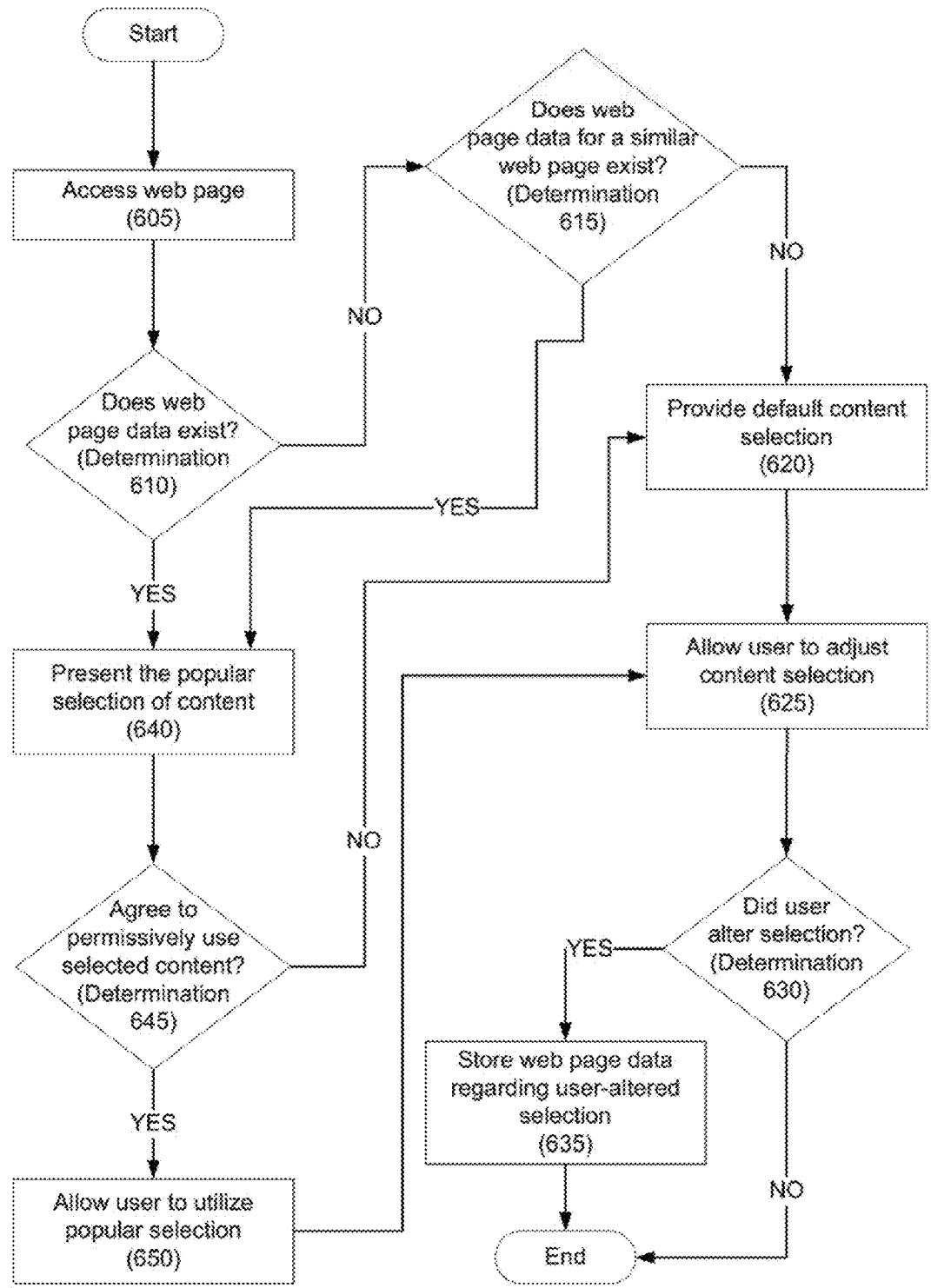
FIG. 6 is a flowchart depicting another for selecting content within a web page using a popular selection, according to another example of the principles described herein.

Turning now to FIG. 6, a flowchart depicting another method for selecting content within a web page (FIG. 4, 400) using a popular selection is shown. The method may start by accessing or downloading a web page (FIG. 4, 400) to a client device (605) operated by a user of a website. Next, it may be determined whether any web page data exists (Determination 610) associated with the web page (FIG. 4, 400) the user is viewing. In one example, it may be determined if web page data has been saved on the popular selection data storage device (FIG. 1, 117) that is similar to the web page data of the web page (FIG. 4, 400) being accessed at that time by the user (Determination 610) as similarly described above in connection with FIG. 5.

If web page data associated with the currently viewed web page (FIG. 4, 400) does not exist (Determination NO, 610) in the popular selection data storage device (FIG. 1, 117), then it may be determined if web page data for a web page that is similar to some degree to the currently accessed web page (FIG. 4, 400) exists (Determination 615). As described above, a similar web page (FIG. 4, 400) may be similar in the type of template used to arrange the text, images, or other content displayed on the web page (FIG. 4, 400). A similar web page (FIG. 4, 400) may also be similar because, although the web page address or Uniform Resource Locator (URL) is not entirely identical, the domain name within the Uniform Resource Locator (URL) is the same. Additionally, a similar web page (FIG. 4, 400) may be similar in the content displayed on the web page (FIG. 4, 400).

If web page data for a web page (FIG. 4, 400) that is similar the currently accessed web page does not exist (Determination NO, 615), then the client device (FIG. 1, 105) may provide a default content selection to a user (620). As similarly discussed above in connection with FIG. 5, this may be performed by the client device (FIG. 1, 105), or after a default selection button (810) is selected by the user on a web browser. After the client device (FIG. 1, 105) has presented a default selection of web page content, the user may then be allowed to adjust the amount of content to be selected (625) within the web page (FIG. 4, 400) as similarly discussed above. Then, the client device (FIG. 1, 105) may determine whether the user altered the selected default content (905) (Determination 630). If the user did not alter the selected default content (905) (Determination NO, 630), then the process terminates. However, if the user did alter the selected default content (905) (Determination YES, 630), then the web page data associated with the user-altered selection is stored (635) for later use by the user and other users who may wish to select the same portions of the web page as the user-altered selection.

Referring again to FIG. 6, if web page data for a web page that is similar to some degree to the currently accessed web page does exist (Determination YES, 615), then the client device may present the popular selection of content of that similar web page (FIG. 4, 400) to the user (640). Upon the provision of a popular selection of content to a user, the client device (FIG. 1, 105) or other computing device within the system (100) of FIG. 1 may prompt the user to agree to the use of his or her selected content (645) for one or more web pages (FIG. 4, 400) the user accesses, including the currently accessed web page. If the user does not to agree, then the system is configured to provide the user with a default selection of web page content, and may be configured to restrict the users access to a popular selection of web page content. If the user agrees, then the system is configured so the user may utilize the popular selection of portions of the currently viewed web page.

For example, the user may be asked to agree to a license agreement to indicate agreement to the use of his or her selected content. In one example, if the user decides not to agree to the license terms (Determination NO, 645), then the system is configured to provide the user with the default selection (905) of web page content (620), and may be configured to restrict the user's access to a popular selection of web page content (1005). However, if the user agrees to the license (Determination YES, 645), then the system is configured so the user may utilize the popular selection of portions of the currently viewed web page. Also, if the user agrees to the license (Determination YES, 645), then the user's future web page content selection may be sent to the popular selection data storage device (FIG. 1, 117) for storage and for use by the user and other users in the future.

In addition to the popular selection of content of that similar web page (FIG. 4, 400), the user may select additional content, or otherwise adjust the popular selection of content (625). The method may further include saving any target web page data to a database thereby allowing easy access to the web page data by a processor (FIG. 1, 125) when the user accesses the web page (FIG. 4, 400) or a web page similar to that web page (FIG. 4, 400). The client device (FIG. 1, 105) may determine whether the user altered the popular selection of content (Determination 630). If the user did not alter the popular selection of content (Determination NO, 630), then the process terminates. However, if the user did alter the popular selection of content (Determination YES, 630), then the web page data associated with the user-altered selection is stored (635) for later use by the user and other users who may wish to select the same portions of the web page (FIG. 4, 400) as the user-altered selection.

Further, as similarly described above in connection with FIG. 5, if web page data relating the web page does exist (Determination YES, 610), then the client device may present the popular selection of content to the user (640). The method then proceeds as explained above with regard to blocks 625, 630, 635, 645, and 650.

In another example, as similarly discussed above, if the user accepts the popular selections initially presented to the user without altering the selected portions, then client device (FIG. 1, 105) may save web page data to the popular selection data storage device (FIG. 1, 117) describing acceptance of the popularly selected portions. Therefore, the popularly selected portions of the web page may be given more weight when presenting those same portions to the user or another user in the future. In this manner, portions of a web page that represent the most user desirable content in that web page may be presented to future users accessing the web page.

Figure 7:
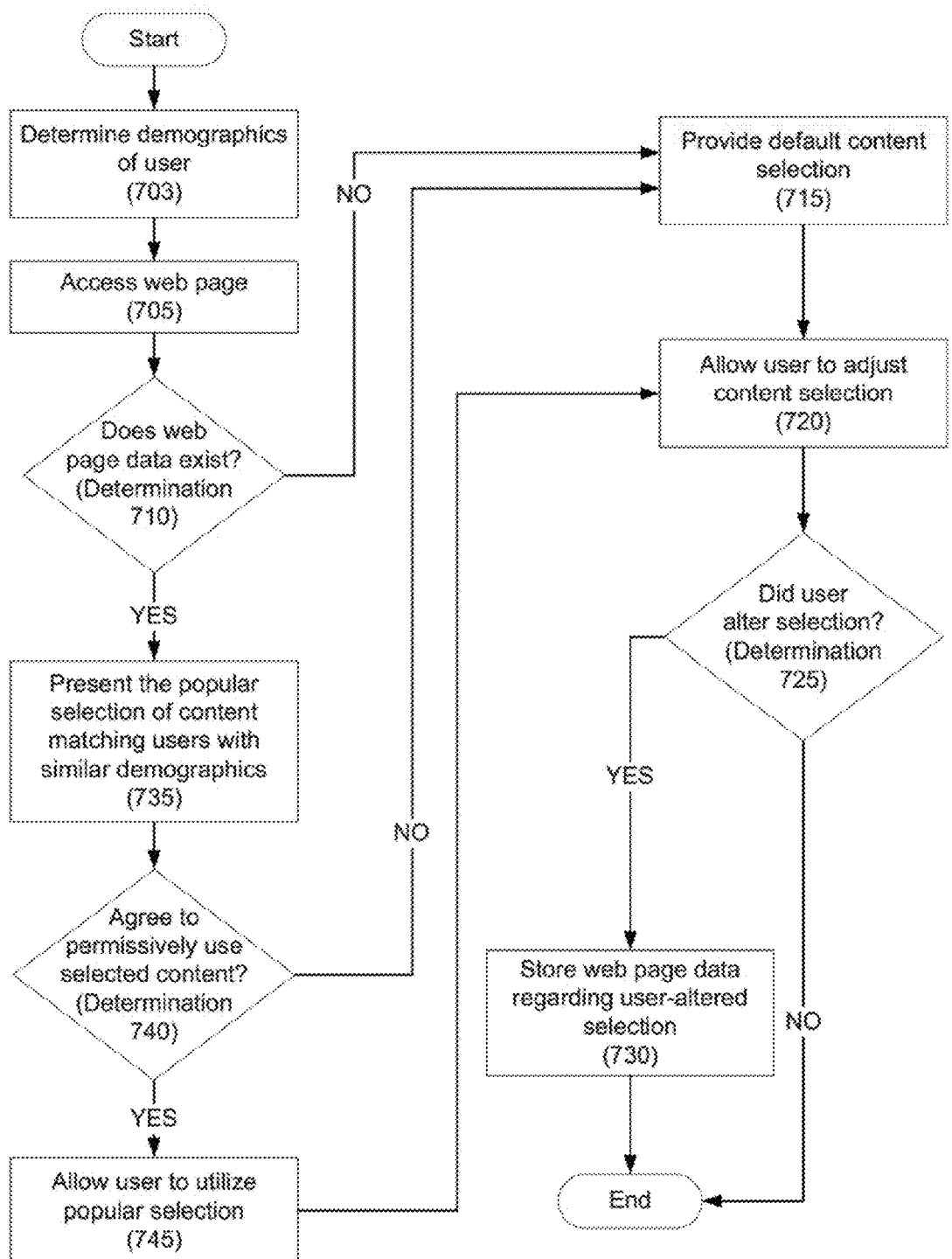
FIG. 7 is a flowchart depicting a method for selecting content within a web page using a popular selection of users with similar demographics, according to yet another example of the principles described herein.

Turning next to FIG. 7, a method for selecting content within a web page (FIG. 4, 400) using a popular selection of users with similar demographics is depicted. The method may start by determining demographics of the user (703). In one example, this may be performed by presenting a modal window to a user, and requesting the user to enter information about him or herself. In another example, the demographics may be determined by monitoring the user's activities, and determining the user's demographics from those activities. For example, the user may access particular web sites or web pages that may be indicative of the user's occupation. In this example, if the user accesses web sites or web pages containing technical documents, then it may be determined that the user is a scientist or engineer. In another example, the user may select portions of a number of web pages that may be indicative of the users age. In this example, if the user selects portions of a web page that relate to newer styles of men's clothing, then it may be determined that the user is a male between the ages of 20 and 30.

The demographics gleaned from the user may include any information particular to the user including, for example, the user's age, gender, race, nationality, creed, place of residence, place of birth, past domiciles, occupation, interests, associations, accolades, languages spoken, places visited, marital status, family status, and combinations of these, among others. Once this information has been received, the method may continue by accessing or downloading a web page (FIG. 4, 400) to a client device (705) operated by the user of a website. Next, it may be determined whether any web page data exists (Determination 710) associated with the web page the user is viewing. In one example, it may be determined if web page data has been saved on the popular selection data storage device (FIG. 1, 117) that is similar to the web page data of the web page (FIG. 4, 400) being accessed at that time by the user (Determination 610) as similarly described above in connection with FIG. 5.

If web page data associated with the currently viewed web page does not exist (Determination NO, 710) in the popular selection data storage device, then the client device (FIG. 1, 105) may provide a default content selection to a user (715). As similarly discussed above in connection with FIG. 5, this may be performed by the client device (FIG. 1, 105), or after a default selection button (805) is selected by the user on a web browser. After the client device (FIG. 1, 105) has presented a default selection of web page content, the user may then be allowed to adjust the amount of content to be selected (720) within the web page a similarly discussed above. Then, the client device (FIG. 1, 105) may determine whether the user altered the selected default content (905) (Determination 725). If the user did not alter the selected default content (905) (Determination NO, 725), then the process terminates. However, if the user did alter the selected default content (905) (Determination YES, 725), then the web page data associated with the user-altered selection is stored (730) for later use by the user and other users who may wish to select the same portions of the web page as the user-altered selection.

Referring again to FIG. 7, if web page data for the currently accessed web page does exist (Determination YES, 710), then the client device may present the popular selection of content of that web page to the user (735) using web page data provided by other users with similar or matching demographics. For example, if the user is a white male from New York City whose occupation is in accounting, then the popular selection of other users with matching or partially matching demographics are presented to the user. This example helps to further refine popular selection of a portion of a web page. It may be assumed that people with different demographics may tend to make different selections of portions of a web page, whereas people with similar demographics are interested in the same content and information within a given web page.

As similarly described above in connection with FIGS. 5 and 6, upon the provision of a popular selection of content to a user, the client device (FIG. 1, 105) or other computing device within the system (100) of FIG. 1 may prompt the user to agree to the use of his or her selected content (740) for one or more web pages (FIG. 4, 400) the user accesses, including the currently accessed web page. The user may be asked to agree to a license agreement to indicate agreement to the use of his or her selected content (740).

The user may or may not agree with the license agreement. In one example, if the user decides not to agree to the license terms (Determination NO, 740), then the system provides the user with the default selection (905) of web page content (715), and may restrict the user's access to a popular selection of web page content (1005). However, if the user agrees to the license (Determination YES, 740), then the user may utilize the popular selection of portions of the currently viewed web page (745). Also, if the user agrees to the license (Determination YES, 740), then the user's future web page content selection may be sent to the popular selection data storage device (FIG. 1, 117) for storage and for use by the user and other users in the future.

In addition to the popular selection of content of that web page (FIG. 4, 400) using web page data provided by other users with similar or matching demographics, the user may select additional content, or otherwise adjust the popular selection of content (720). The method may further include saving any target web page data to a database thereby allowing easy access to the web page data by a processor when the user accesses the web page or a web page similar to that web page. The client device may determine whether the user altered the popular selection of content (Determination 725). If the user did not alter the popular selection of content (Determination NO, 725), then the process terminates. However, if the user did alter the popular selection of content (Determination YES, 725), then the web page data associated with the user-altered selection is stored (730) for later use by the user and other users who may wish to select the same portions of the web page as the user-altered selection.

In another example, as similarly discussed above, if the user accepts the popular selections initially presented to the user without altering the selected portions, then client device (FIG. 1, 105) may save web page data to the popular selection data storage device (FIG. 1, 117) describing acceptance of the popularly selected portions. Therefore, the popularly selected portions of the web page may be given more weight when presenting those same portions to the user or another user in the future. In this manner, portions of a web page that represent the most user desirable content in that web page may be presented to future users accessing the web page.

As discussed above, selection of desired content in web pages based on a popular selection of portions of a web page can eliminate extraneous or undesired content and significantly streamline a number of workflows. For instance, besides printing a physical copy of desired portions of a web page without reproducing any of the irrelevant content on the web page containing the article, an owner of a web page may wish to display and view the most relevant web content on a computing device that has a limited screen size. In one example, the above system and methods may be provided in conjunction with, for example, a smart phone, a mobile phone, a personal digital assistant (PDA), or any other computing device that has a smaller screen size.

The methods described above can be accomplished by a computer program product comprising a computer readable storage medium having computer usable program code embodied therewith that, when executed, performs the above methods. Specifically, the computer usable program code may access web page data associated with a web page, the web page data comprising a popular selection of content on the web page (FIG. 505, 510), and present the popular selection of content of the web page to a user (FIG. 5, 535). The computer usable program code may further determining if web page data comprising a popular selection of content on the web page exists (FIG. 5, 510), present the popular selection of content of the web page to the user if the web page data comprising a popular selection of content on the web page exists (FIG. 5, 535), and provide a default content selection to the user if the web page data comprising a popular selection of content on the web page does not exist (FIG. 5, 515). Still further, the computer usable program code may prompt the user to agree to the use of the user's selections of content on web pages (Determination 540), and if the user agrees, allow the user to utilize the popular selection (545). Even still further the computer usable program code may determining a demographic of the user (FIG. 7, 703), determine existence of other users with a common demographic (FIG. 7, 703), access the other users' web page content selection of the web page (FIG. 7, 705,710), and present the other users' web page content selection of the web page to the user (FIG. 7, 735).

The present specification discloses systems and methods of selecting content within a web page using a popular selection. As discussed above, there are many applications where selecting one or more portions of a web page can be advantageous. For purposes of explanation, the specification uses the illustrative example of selecting portions of a web page to enhance the printing of the web page. Currently, when a web page is printed, it includes a variety of contents. For example, in addition to the main content, many web pages display content such as background imagery, advertisements, or navigation menus, headers/footers, and links to additional content, among others. Some of the content of a web page may be print worthy, but the user may not want to print some or all of the auxiliary content. Ideally, the present system and method may access web page data associated with a web page, the web page data comprising a popular selection of content on the web page, and present the popular selection of content of the web page to a user for printing, viewing, archiving, or any other useful purpose.

There are a number of challenges in the selection of desired portions of web pages. For example, web pages vary widely by content type. Common types of web pages include: news, shopping, blog, map, and recipe web pages. The web page layouts also vary widely across the different types of web pages. The web pages also included a variety of content, including text, images, video and flash. To effectively select desired portions in a web page, popular selections of portions of a particular web page or similar web pages by a number of other users may be determined.

This specification and the accompanying figures describe systems and methods of selecting content within a web page using a popular selection. A data storage device including a database of web page data may be maintained where the web page data comprises data associated with selections of portions of the web pages that other users have made. If these selections are repeated to a certain threshold, then the user may be presented with the popular selection of those portions of the web page. Other users' selections of similar web pages may be used for the same purpose. Further, demographics may be gleaned from the user and other users and compared, and those selections of portions of the web page that were provided by users with similar demographics may be presented to the user. This selection of web page content using popular selection may have a number of advantages, including: ease of presenting selected portions of a web page to a user that reflects what most users want to select while reducing or eliminating the need for manual selection by the user. These advantages would assist a user in printing or archiving only desired portions of a web page, and viewing these desirable portions on computing devices with smaller screens such as a mobile phone. All of these advantages are possible without extra programming or configuration needed to add new web sites or identify new web sites. Further, no cooperation is needed from the web site publisher, web page server administrator, or other party.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for selecting web page content based on user permission collecting user-selected content within a web page comprising:
   analyzing web page content of a web page displayed in a web browser to determine at least one block of content;
   accessing web page data stored in a popular selection data storage device associated with the web page, the web page data comprising a consensus-based selection of content in the web page;
   determining at least one popular selection by comparing the determined at least one block of content with the consensus-based selection of content;
   presenting the popular selection of content to a user;
   creating a selection of the at least one block of content based on the user's selection of content, the selection of content comprising a preliminary selection of content;
   indicating the selection of content using a number of control points located around the at least one block of selected content;
   providing a default selection button and a popular selection button integrated in the web browser;
   responsive to activation of the popular selection button:
      requesting authorization from the user to the use of the user's selected content in exchange for use of the popular selection of content on the web page;
      when the user provides authorization, changing the indicated selection to the popular selection; and
      when the user does not provide authorization, restricting the user's access to the popular selection of content of the web page;
   responsive to activation of the default selection button, changing the indicated selection to the default selection;
   responsive to the user dragging one or more control points, changing the indicated selection to reflect the change in the control points; and
   saving the indicated selection.

2. The method of claim 1, further comprising,
   determining if the web page data comprising the consensus-based selection of content on the web page exists prior to comparing the consensus-based selection of content to the at least one block of content;
   presenting the popular selection of content of the web page to the user when the web page data comprising the consensus-based selection of content on the web page exists, and
   providing the default content selection to the user when the web page data comprising the consensus-based selection of content on the web page does not exist.

3. The method of claim 2, in which determining when the web page data comprising the consensus-based selection of content on the web page exists comprises:
   accessing other users' web page content selection of the web page; and
   determining what portions of the web page selected by the other users is the consensus-based selection.

4. The method of claim 3, in which determining what portions of the web page selected by the other users is the consensus-based selection comprises at least one of: determining how many times a node within the web page was selected by the other users, determining how many times the node within the web page was selected by the other users above a predetermined fraction, determining how consistently the node within the web page was selected by the other users, determining correlations between how related nodes within the web page were selected, or combinations thereof.

5. The method of claim 2, in which determining when the web page data comprising the consensus-based selection of content on the web page exists comprises:
   accessing other users' web page content selection of similar web pages; and
   determining what portions of the similar web pages were selected by the other users,
   wherein a similar web page is a non-identical web page as compared to the web page and comprises a number of similar features.

6. The method of claim 1, further comprising:
   determining a demographic of the user;
   determining existence of other users with a common demographic;
   accessing the other users' web page content selection of the web page; and
   determining the consensus-based selection based on the other user's web page content selection of the web page.

7. The method of claim 1, wherein the web page data associated with a web page does not contain data that identifies a particular person.

8. The method of claim 1, further comprising identifying user selections of portions of the web page in addition to the popular selection of content and the default content selection via the user interface.

9. A system for selecting web page content based on user permission for collecting user-selected content within a web page comprising:
   a data storage device that stores web page data associated with a web page, the web page data comprising a consensus-based selection of content of a number of other users within the web page; and
   a data processing device, communicatively coupled to the data storage device, that accesses the web page data, and presents the consensus-based selection of content of the number of other users of the web page to a user, in which the data processing device further:
      analyzes web page content of the web page displayed in a web browser to determine at least one block of content;
      determines a demographic of the user;
      determines existence of other users with a common demographic;
      accesses the web page data stored in the popular selection data storage device;

determines a popular selection of content by comparing the determined block of content with the consensus-based selection of content;

presents the popular selection of content to the user;

creates a selection of the at least one block of content, the selection of content comprising a preliminary selection of content;

indicates the selection of content using a number of control points located around the at least one block of selected content;

provides a default selection button and a popular selection button integrated in the web browser;

responsive to activation of the popular selection button:

requests authorization from the user to the use of the user's selected content in exchange for use of the popular selection of content;

when the user provides authorization, changes the indicated selection to the popular selection; and when the user does not provide authorization, restricts the user's access to the popular selection of content of the web page;

responsive to activation of the default selection button, changes the indicated selection to a default selection;

responsive to the user dragging one or more control points, changes the indicated selection to reflect the change in the control points; and saves the indicated selection.

10. The system of claim 9, in which the data storage device is communicatively coupled to the data processing device via a network.

11. The system of claim 9, in which the data storage device is resident on a computing device comprising the data processing system.

12. The system of claim 9, in which the device system is resident on a web page server.

13. The system of claim 9, wherein the demographics are determined by monitoring the user's activities, and determining the user's demographics from those activities.

14. A computer program product for selecting web page content based on user permission for collecting user-selected content within a web page, the computer program product comprising:

a computer readable storage device having computer usable program code embodied therewith, the computer usable program code to, when executed:

analyze web page content of a web page displayed in a web browser to determine at least one block of content;

access web page data stored in a popular selection data storage device associated with the web page, the web page data comprising a consensus-based selection of content in the web page;

determine at least one popular selection by comparing the determined at least one block of content with the consensus-based selection of content;

present the popular selection of content of the web page to a user, create a selection of the at least one block of content based on the user's selection of content, the selection of content comprising a preliminary selection of content;

indicating the selection of content using a number of control points located around the at least one block of selected content;

providing a default selection button and a popular selection button integrated in the web browser;

responsive to activation of the popular selection button;

requesting authorization from the user to the use of the user's selected content in exchange for use of the popular selection of content on the web page;

when the user provides authorization, changing the indicated selection to the popular selection; and when the user does not provide authorization, restricting the user's access to the popular selection of content of the web page; and responsive to activation of the default selection button, changing the indicated selection to a default selection;

responsive to the user dragging one or more control points, changing the indicated selection to reflect the change in the control points; and saving the indicated selection.

15. The computer program product of claim 14, further comprising computer usable program code to, when executed:

determine if web page data comprising the consensus-based selection of content on the web page exists;

present the popular selection of content of the web page to the user as the selected web page content if the web page data comprising the consensus-based selection of content on the web page exists; and provide a default content selection to the user as the selected web page content if the web page data comprising the consensus-based selection of content on the web page does not exist.

\* \* \* \* \*

UNITED STATES PATENT AND TRADEMARK OFFICE
CERTIFICATE OF CORRECTION

PATENT NO.        : 9,448,695 B2                           Page 1 of 1
APPLICATION NO.   : 13/817725
DATED             : September 20, 2016
INVENTOR(S)       : Eamonn O'Brien-Strain et al.

It is certified that error appears in the above-identified patent and that said Letters Patent is hereby corrected as shown below:

In the Claims

In Column 24, Line 20 approx., in Claim 14, delete "button;" and insert -- button: --, therefor.

Signed and Sealed this
Seventh Day of February, 2017

Michelle K. Lee
*Director of the United States Patent and Trademark Office*